United States Patent [19]

Chen

[11] Patent Number: 5,716,141
[45] Date of Patent: Feb. 10, 1998

[54] PRECISION SELF-CONTAINED HYDRODYNAMIC BEARING ASSEMBLY

[75] Inventor: Shuo-Hao Chen, Fremont, Calif.

[73] Assignee: Quantum Corporation, Milpitas, Calif.

[21] Appl. No.: 725,224

[22] Filed: Sep. 30, 1996

Related U.S. Application Data

[60] Continuation of Ser. No. 660,666, Jun. 5, 1996, abandoned, which is a division of Ser. No. 353,171, Dec. 8, 1994, Pat. No. 5,579,579.

[51] Int. Cl.$^6$ .................................................. F16C 32/06
[52] U.S. Cl. .................................................. 384/114; 384/100
[58] Field of Search .................................. 387/100, 107, 387/111, 114, 118, 119, 120

[56] References Cited

U.S. PATENT DOCUMENTS

| | | | |
|---|---|---|---|
| 4,596,474 | 6/1986 | Van Roemburg | 384/114 |
| 4,798,480 | 1/1989 | Van Beek | 384/114 |
| 4,961,122 | 10/1990 | Sakai et al. | 384/114 X |
| 5,112,142 | 5/1992 | Titcomb et al. | 384/107 |
| 5,265,334 | 11/1993 | Lucier | 29/898.02 |
| 5,407,281 | 4/1995 | Chen | 384/107 |
| 5,415,476 | 5/1995 | Onishi | 384/114 |

FOREIGN PATENT DOCUMENTS

| | | |
|---|---|---|
| 0 117 873 | 9/1984 | European Pat. Off. . |
| 2 269 211 | 2/1994 | United Kingdom . |

Primary Examiner—Thomas R. Hannon
Attorney, Agent, or Firm—David B. Harrison; Debra A. Chun; William J. Kubida

[57] ABSTRACT

A method for forming a precision groove in a cylindrical surface of an article such as a sleeve-shaft hydrodynamic journal bearing system includes the steps of: aligning a groove-forming machine to an axial datum plane of the article defined in a spaced-apart relation with the cylindrical surface by a predetermined nominal first dimension, translating the groove-forming machine in an axial direction toward and upon a first edge of the cylindrical surface by an amount equal to the predetermined nominal first dimension and thereupon forming a first groove axial step segment in the cylindrical surface until a second predetermined axial datum plane is reached, simultaneously axially translating and rotating the groove-forming machine from the second axial datum plane until a third predetermined axial datum plane is reached and thereupon forming the precision groove pattern in the cylindrical surface between the second axial datum plane and the third axial datum plane, and axially translating the groove-forming machine from the third predetermined axial datum plane until a second edge of the cylindrical surface is reached and thereupon forming a second groove axial step segment in the cylindrical surface from the third axial datum plane to the second edge. A hydrodynamic being system formed in accordance with the disclosed method is also claimed.

8 Claims, 5 Drawing Sheets

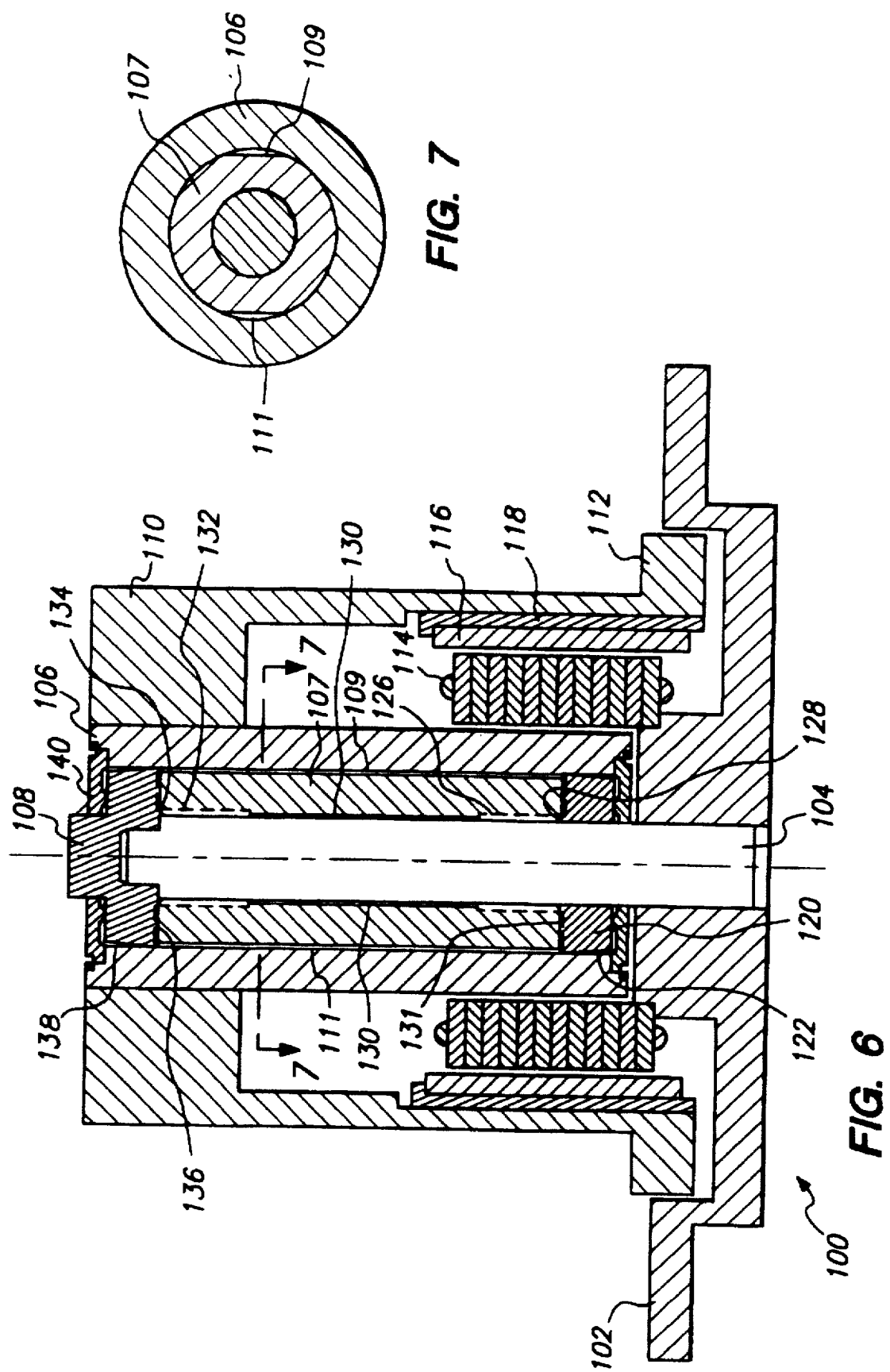

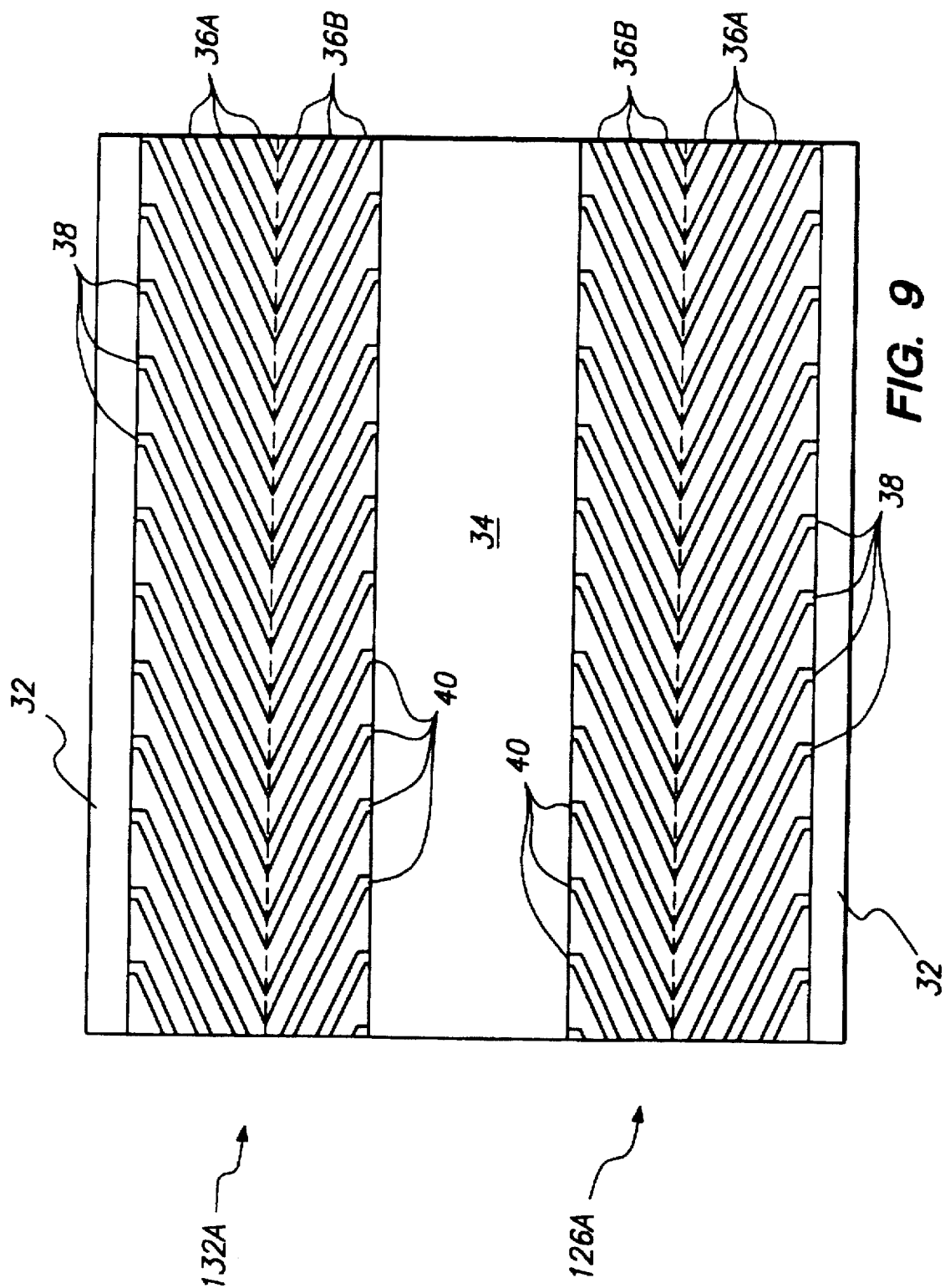

PRECISION SELF-CONTAINED HYDRODYNAMIC BEARING ASSEMBLY

This application is a continuation of application Ser. No. 08/660,666 filed Jun. 5, 1996, now abandoned which is a division of application Ser. No. 08/353,171, filed Dec. 8, 1994, U.S. Pat. No. 5,579,579.

FIELD OF THE INVENTION

The present invention relates to self-contained hydrodynamic bearing assemblies. More particularly, the present invention relates to a method for forming precision spiral groove hydrodynamic journal and thrust bearings, thereby minimizing net pumping action and flow, resultant loss of bearing lubricant, and entrainment of air within the bearing system.

BACKGROUND OF THE INVENTION

Hydrodynamic bearings have been proposed for supporting spindle assemblies within disk drives. These prior approaches have typically employed one type of hydrodynamic bearing known as a spiral groove bearing. The spiral groove journal bearing features a unitary shaft and a unitary sleeve, both being sized, formed and mounted for rotation relative to one another. Hydrodynamic action in the bearing is achieved by providing one of two facing surfaces of each journal bearing region with a suitable helical groove pattern for pumping bearing lubricant during relative rotation, while the other facing surface of the journal bearing region is typically very smooth.

Hydrodynamic bearing spindle systems are provided and used in contemporary disk drive spindles as self-contained bearing systems. A typical self-contained hydrodynamic spindle bearing system includes a shaft and a sleeve cooperatively defining a pair of spaced-apart radial grooved journal bearings and a pair of axial grooved thrust bearings, with sealing mechanisms located at the system boundaries with the ambient environment. Common sealing mechanisms include surface tension capillary seals, seals formed with barrier film coatings, seals formed with divergent geometries, seals formed with pumping grooves, and combinations of the foregoing mechanisms. The seals are needed to prevent loss of lubricating liquid. Loss of lubricant must be minimized in order to prevent lubricant starvation of the bearing leading to spindle failure. Of equal concern within hard disk drive closed environments, loss of lubricant into the head-disk environment may lead to contamination of the head-disk interface, and resultant head crashes and damage to the head and/or disk and resultant loss of the drive's usefulness.

The advantages and drawbacks of using pumping grooves for sealing are explained, for example, in U.S. Pat. No. 4,596,474 to Van Roemburg, entitled: "Bearing System Comprising Two Facing Hydrodynamic Bearings"; and in U.S. Pat. No. 4,798,480 to Van Beek, entitled: "Beating System with Active Reservoir Between Two Axially Spaced Hydrodynamic Bearings". The disclosures of these two patents are incorporated herein by reference.

When surface tension capillary seals and/or barrier film seals are employed, it is necessary to prevent pressure build-up otherwise resulting from net groove pumping action which exceeds the sealing capability of the particular sealing mechanism. Otherwise, the pressure build-up will lead to a net flow of lubricant along an axial direction of relative rotation and unwanted lubricant migration out of the bearing system. Because the fluid pumping forces from the spiral or helical grooves are typically one or more orders of magnitude larger than the surface tension forces present at the capillary seal, a common practice has been to design self-contained hydrodynamic bearing systems with pressure balancing groove patterns. For example, pressure balancing within a single journal bearing may be achieved by using two helical groove patterns which cooperate to define a symmetrical herringbone pattern.

It has been previously discovered that closed-loop recirculation of lubricant between outer and inner capillary seals of two spaced-apart thrust bearings of a self-contained bearing system reduces at least static pressure otherwise tending to cause surface tension capillary seals to leak, see U.S. Pat. No. 5,112,142 to Titcomb et al., entitled "Hydrodynamic Bearing", the disclosure thereof being incorporated herein by reference.

A pronounced trend toward miniaturization is present with contemporary disk drive designs in both overall form factor, and in the disk spindle height dimension. Because of size compaction of disk drive spindles, the length of a typical herringbone helical groove bearing used in the disk spindle is approximately 3 mm (0.12"). A 0.03 mm (0.001") offset of the herringbone apex from a location of symmetry may be sufficiently large enough to create an unbalanced pumping force which results in lubricant leakage. Accordingly, extremely stringent tolerances are required during manufacturing in order to achieve a usable pair of pressure-balancing helical grooves forming the herringbone pattern. This high level of required precision in turn has heretofore required very high manufacturing costs and has resulted in unacceptably low yields within a mass production manufacturing environment.

While manufacturing processes are well known for forming the journal bearing regions of a shaft-sleeve hydrodynamic bearing assembly, at least two independent machining processes and set-ups are typically required. A first machining process, carried out on a precision numerically controlled lathe, results in formation of raised cylindrical walls on either the shaft, or the sleeve, of the bearing assembly, separated by an inner relieved cylindrical area forming a continuous reservoir for lubricant between the two journal bearings and by two axially outer lubricant reservoirs leading to the sealing regions at the ambient interface. Hydrodynamic axial thrust bearings may also be formed between the journal bearing outer lubricant reservoirs and the sealing regions.

After the shaft and/or sleeve has been machined on the lathe to define a raised cylindrical region to be grooved, the machined part is then subjected to a separate groove-forming process. For example, the part or article to be grooved may be installed on a separate grooving machine, such as one employing the precision ball coining or embossing technique described in U.S. Pat. No. 5,265,334 to Lucier, entitled: "Device for Manufacturing a Groove Bearing, and Method of Manufacturing a Groove Bearing by Means of the Device" the disclosure thereof being incorporated herein by reference. Precise groove patterns are said to be achieved in accordance with the methods of the '334 patent by simultaneous translation and rotation of the forming ball or balls within the forming machine relative to the cylindrical raised surface to be grooved. Other grooving techniques may be employed, such as selective patterning of etch resist and chemical wet etch, grinding under precise numerical control, ablation by selective positioning and activation of a laser, etc. Irrespective of the particular groove forming method, it is conventionally carried out as a step which is subsequent to and separate from the step of forming the raised cylindrical region.

In order to form a precise herringbone groove pattern on each journal bearing region following the lathing step, in accordance with the prior art approaches the grooving machine must be referenced precisely to a starting location, and ending location, of each raised cylindrical journal bearing region to receive groove-forming ball coining process. Such locating presupposes that each raised bearing region was turned to a precise cylindrical length after being referenced with respect to a precise fiducial datum plane by the lathe, and further presupposes that the ball-grooving machine is thereafter aligned with the same precise fiducial datum plane prior to forming the precise herringbone groove patterns into each raised journal region. The same considerations apply to forming grooves on raised journal portions of the shaft, as opposed to the sleeve, should this alternative arrangement be desired. Holding extremely tight tolerances during manufacturing is extremely difficult and costly, and constitutes a major drawback in adoption and use of hydrodynamic bearing systems within mass produced motors, such as spindle motors for miniature hard disk drives. Alternatively, the steps of measuring actual tolerances of each machined article, and adjusting the grooving machine to compensate for tolerances, slows production and introduces further possible sources of error into the grooving process.

Thus, a hitherto unsolved need has arisen for a manufacturing method for forming pumping grooves within a spiral groove hydrodynamic bearing system which overcomes the limitations, costs and drawbacks otherwise associated with prior groove forming methods.

SUMMARY OF THE INVENTION WITH OBJECTS

A general object of the present invention is to provide a method for forming precision groove patterns in a raised cylindrical surface portion of an article turned on a lathe, such as a raised cylindrical surface portion of a shaft or sleeve, in a manner enabling relaxation of starting location and length dimension of the raised portion overcoming limitations and drawbacks of the prior art.

Another object of the present invention is to axially translate a groove forming machine relative to an article to be grooved for a short, indeterminate initial distance along the article, depending upon machining tolerances before simultaneously translating and rotating the article relative to the groove forming machine for forming a precise groove pattern in the article, and then to axially translate the groove forming machine relative to the article following completion of the precise groove pattern for another indeterminate distance also dependent upon manufacturing tolerance of the particular article to be grooved.

A further object of the present invention is to provide a method for forming precision spiral groove pumping patterns within hydrodynamic journal bearing systems in a manner precisely controlling grooving pattern formation to minimize net axial pumping of hydrodynamic bearing lubricant within the bearing system.

Another object of the present invention is to provide a practical groove forming method for producing precision grooving patterns in a raised cylindrical region of an article in a manner overcoming manufacturing tolerances associated with locating and forming the raised cylindrical region and associated with forming the groove in the region.

One more object of the present invention is to provide an improved hydrodynamic spindle bearing system for a hard disk drive in a manner overcoming limitations and drawbacks of prior approaches.

In accordance with principles of the present invention, a method is provided for manufacturing a precision groove pattern in a cylindrical surface of an article. The method includes the steps of:

aligning a groove-forming machine to an axial datum plane of the article defined in spaced-apart relation with the cylindrical surface by a predetermined nominal first dimension, translating the groove-forming machine in an axial direction toward and upon a first edge of the cylindrical surface by an amount equal to the predetermined nominal first dimension and forming a first groove axial step segment in the cylindrical surface until a second predetermined axial datum plane is reached, simultaneously axially translating and rotating the groove-forming machine from the second axial datum plane until a third predetermined axial datum plane is reached and forming the predetermined precision groove pattern in the cylindrical surface between the second axial datum plane and the third axial datum plane, axially translating the groove-forming machine from the third predetermined axial datum plane until a second edge of the cylindrical surface is reached and forming a second groove axial step segment in the cylindrical surface from the third axial datum plane to the second edge.

In a related aspect of the invention, the groove-forming machine includes at least one rotating groove forming ball, and the steps of forming the first groove axial step segment, the predetermined precision groove pattern, and the second groove axial step segment are respectively carried out by translating, translating and rotating, and translating the ball relative to the cylindrical surface.

In a related aspect of the invention, the groove-forming machine may include any suitable groove cutting, embossing, or milling element such that the predetermined precision groove pattern and the groove axial step segment are formed by first translating, then translating and rotating and finally translating the groove forming element of the machine relative to the surface to be grooved.

In a related aspect of the invention, the step of simultaneously axially translating and rotating the groove-forming machine between the second axial datum plane and the third axial datum plane comprises the further step of reversing rotation of the groove-forming machine at an axial plane of symmetry located between the second and third axial datum planes.

In a further related aspect of the invention, the step of simultaneously axially translating and rotating the groove-forming machine forms a Vee-shaped precision groove in the cylindrical surface between the second axial datum plane and the third axial datum plane, and the axial plane of symmetry is located equidistant between the second axial datum plane and the third axial datum plane.

In another aspect of the present invention, the article comprises a sleeve or shaft of a sleeve-shaft hydrodynamic journal bearing system and two raised, axially spaced apart, cylindrical surfaces of the sleeve or shaft are grooved in accordance with the method to provide precise pumping grooves at journal bearing regions of the hydrodynamic journal bearing system.

In one more aspect of the present invention, a self-contained hydrodynamic spiral groove bearing system for a hard disk drive spindle is realized with minimized static and dynamic pumping characteristics, thereby minimizing loss of bearing lubricant via capillary seals to the environment.

As another facet of the invention, a self-contained, spiral-groove hydrodynamic spindle bearing system comprises a shaft and a sleeve closely fitting over the shaft for enabling relative rotation between the shaft and the sleeve. The shaft and sleeve cooperatively define two spaced apart hydrodynamic bearing regions, each bearing region being characterized by a spiral-groove pumping pattern of grooves defined in one of the shaft and sleeve. Each one of the pumping grooves including a longitudinally extending groove step at an outer end and at an inner end of the groove. Hydrodynamic lubricant is installed in the bearing system and is pumped at the bearing regions during relative rotation between the shaft and the sleeve, with minimized net lubricant flow out of the bearing system, because of the outer and inner steps of each groove.

These and other objects, advantages, aspects and features of the present invention will be more fully understood and appreciated upon consideration of the following description of a preferred embodiment, presented in conjunction with the accompanying drawings.

BRIEF DESCRIPTION OF THE DRAWINGS

In the Drawings:

FIG. 6 is a diagrammatic view in elevation and cross-section of a DC brushless motor, such as a disk drive spindle motor, incorporating a hydrodynamic journal and thrust bearing system in which at least the journal bearings are formed in accordance with the FIG. 5 groove-forming methodology.

FIG. 7 is a view in section of a bearing sleeve of the FIG. 6 hydrodynamic bearing system of FIG. 6, taken along the line 7–7 in FIG. 6.

FIG. 9 is a diagrammatic unwrap plan view of a self-contained spiral groove hydrodynamic bearing sleeve in which the two illustrated bearing surfaces are arranged to have asymmetrical spiral pumping grooves while maintaining overall fluid pressure balance and which include steps in the pattern in accordance with principles of the present invention.

DETAILED DESCRIPTION OF A PREFERRED EMBODIMENT

Figure 1:
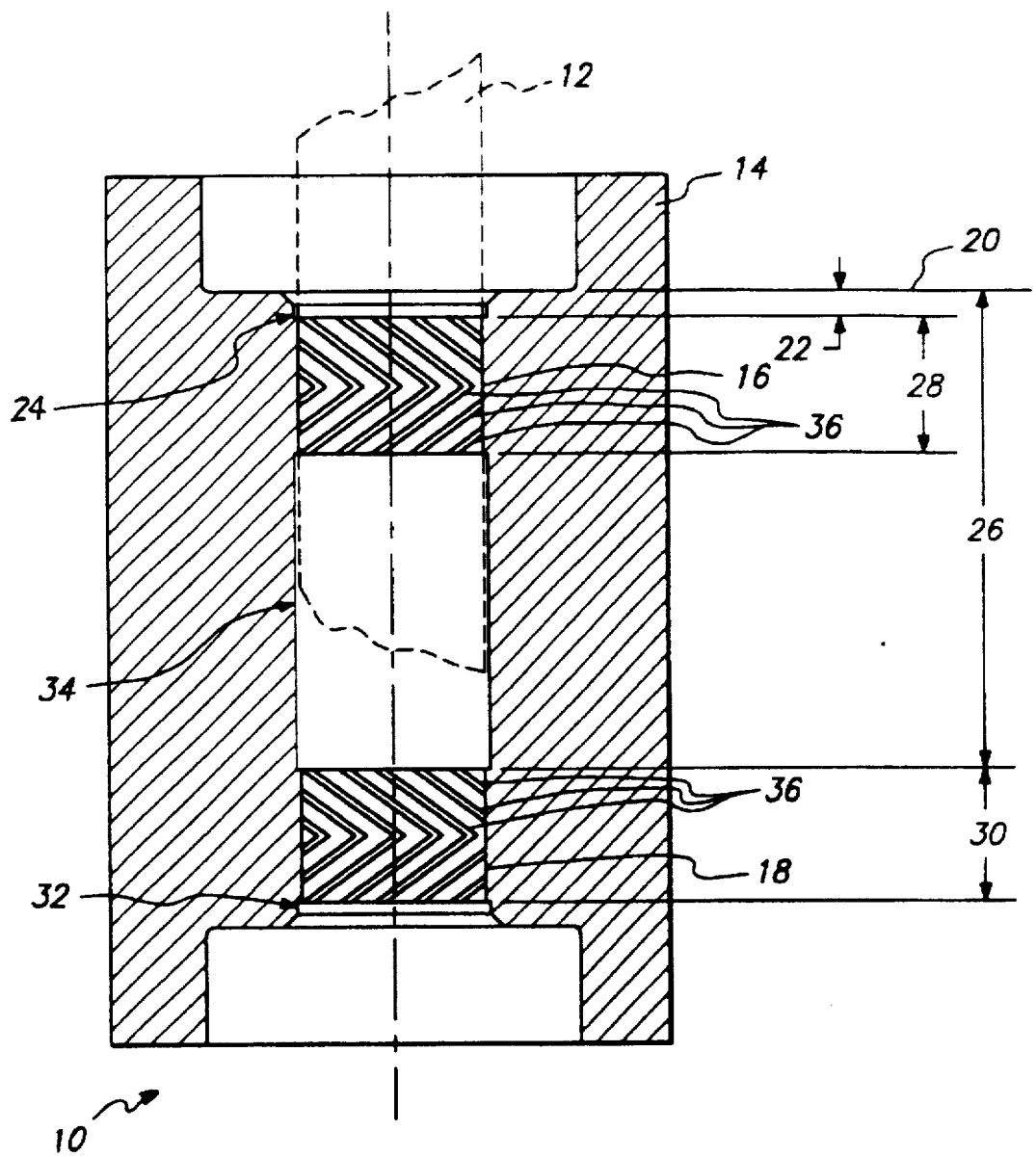
FIG. 1 is a diagrammatic sectional view of a spiral groove hydrodynamic journal bearing system comprising two nominally symmetrical herringbone groove patterns formed e.g. in raised portions of a sleeve, a portion of a shaft for cooperating with the sleeve being shown in broken outline view.

With respect to FIG. 1, a spiral groove hydrodynamic journal bearing system 10 conventionally includes a shaft 12 (partially shown in broken line outline), and a sleeve 14. By "spiral groove hydrodynamic bearing" is meant any fluid bearing system in which grooves and relative rotation of components result in pumping of hydrodynamic lubricant at the bearing surface or surfaces (irrespective of a particular geometry followed by the pumping groove or grooves).

In the FIG. 1 view, the sleeve 14 includes two inwardly raised cylindrical regions 16 and 18. The inwardly facing surfaces of the raised cylindrical regions 16 and 18 are grooved into a repeating herringbone pumping pattern by a suitable groove forming method. The method may include selective patterning and removal of resist followed by chemical etch in the manner of semiconductor technology, it may involve a cutting operation performed by a cutting tool operating under machining numeric control, it may be an ablative removal process such as laser machining, and it may be by using a ball grooving machine.

Irrespective of the particular groove forming method or technology employed to form the symmetrical herringbone groove pumping pattern, the grooving process is aligned and referenced to an axial datum plane 20 which is displaced by a nominal displacement distance from the raised cylindrical regions 16 and 18. The first raised cylindrical region 16 begins inwardly of the axial datum plane 20 by a displacement 22 marking an axial length of an upper and outer lubricant reservoir region 24. A second displacement dimension 26 from the axial datum plane 20 marks a location of beginning of the second cylindrical region 18 forming the second hydrodynamic bearing. The bearing region 16 has an axial length dimension 28, while the bearing region 18 has an axial length dimension 30. A lower and outer reservoir region 32 extends axially beyond the raised cylindrical region 18. A recessed central cylindrical reservoir region 34 extends between axially inner ends of the bearing regions 16 and 18 and provides a primary reservoir for supplying lubricating liquid to the hydrodynamic journal bearings. Lubricant is loaded into the bearing system in any suitable manner, such as by pressure or vacuum introduction, or ultrasound, or both, etc.

After the cylindrical regions 16 and 18 are defined e.g. by turning on a precision metal lathe, a separate grooving tool or machining set up is then employed to form the repeating herringbone groove pattern on the raised regions 16 and 18 of the bearing sleeve 14 (or alternatively on raised regions of the shaft 12, should that arrangement be selected). For example, in order to form precisely symmetrical herringbone patterns, a ball grooving machine is first referenced to the axial datum plane 20 and must be given the precise displacements 22 and 26, as well as the precise lengths 28 and 30, in order to form the desired symmetrical herringbone groove patterns 36. The grooves may then be formed in accordance with the teachings of the referenced U.S. Pat. No. 5,265,334, which calls for relative axial translation and simultaneous relative rotation between a ball forming element at the cylindrical region 16 or 18 being grooved. However, because of machining tolerances arising from formation of the raised regions 16 and 18, the displacements 22 and 26, as well as the lengths 28 and 30 are subject to variations, and unless these dimensions are measured in every instance in manufacture of the journal system, non-symmetrical groove patterns are likely to result, leading to net pumping action and unwanted flows of lubricating liquid out of the hydrodynamic bearing system 10 (i.e. when the net pumping action exceeds surface tension force of a capillary seal to ambient)

Figure 2:
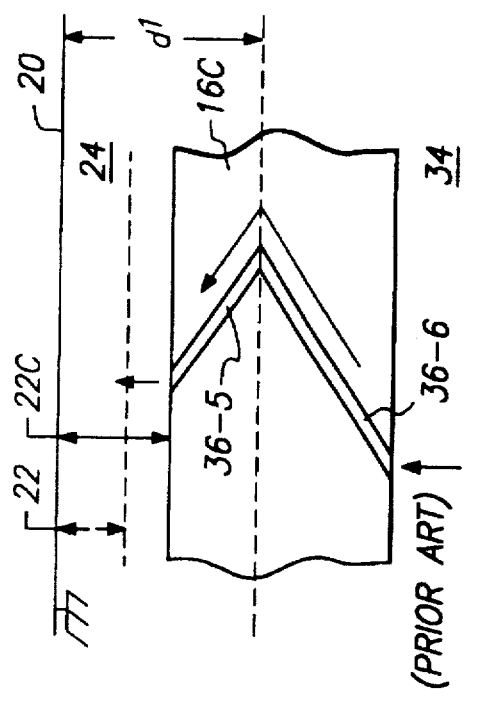
FIG. 2 is a diagrammatic unwrap plan view of a herringbone groove formed simultaneous axial translation and rotation of a forming ball across oversized raised portion thereby illustrating an oversize tolerance encountered in the prior an groove-forming method.

For example, with reference to FIG. 2, a raised journal region 16A is slightly longer than nominal along the axial dimension of the bearing system 10, and begins closer to the axial datum plane 20 by a dimension 22A, as compared with the nominal dimension 22. When the ball forming machine commences its simultaneous axial translation and rotation at the edge marked by the dimension 22A, a first or outer groove segment 36-1 will be formed. Formation of the outer groove segment 36-1 will continue until a locus of symmetry is reached at a reference displacement d1 from the axial datum plane 20, at which point the rotation of the grooving balls reverses while axial translation continues until the inner end of the raised portion 16A is reached. This groove-forming operation, diagrammed in FIG. 2, shows that the outer groove segment 36-1 is longer than its complement groove segment 36-2. This inequality in length results in a pumping pressure differential at the locus of symmetry d1 with resultant unwanted net pumping action and lubricant flow from the outer reservoir 24 to the central lubricant reservoir 34, as shown by the arrows in FIG. 2.

Figure 3:
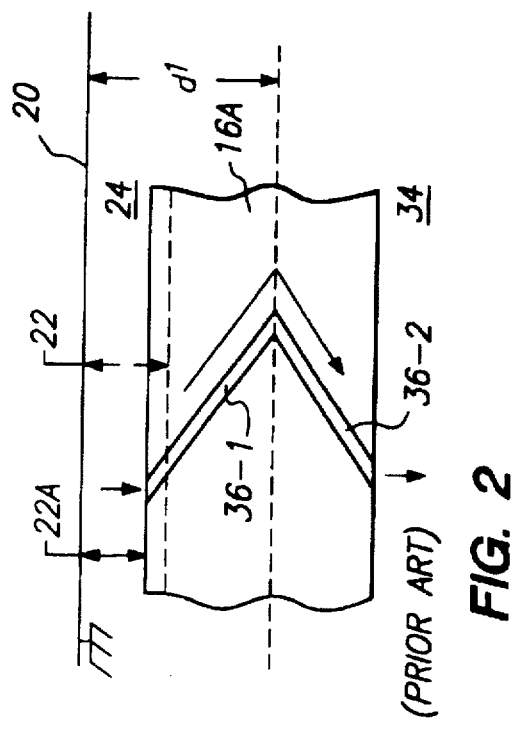
FIG. 3 is a diagrammatic unwrap plan view of a herringbone groove formed in an undersized raised portion, illustrating an oversize tolerance encountered in the prior-art groove-forming method.

FIG. 3 illustrates a converse of the dimensional variation presented in FIG. 2. In FIG. 3, the raised region 16B is shorter in axial length than nominal, and an outer edge begins at a dimension 22B which is longer than the nominal dimension 22 from the axial datum plane 20. This arrangement, with conventional grooving techniques, results in outer groove segments 36-3 which are shorter in length than inner groove segments 36-4, and a net pumping of lubricant occurs from the central reservoir region 34 to the outer reservoir 24, as shown by the direction of the arrows in FIG. 3.

Figure 4:
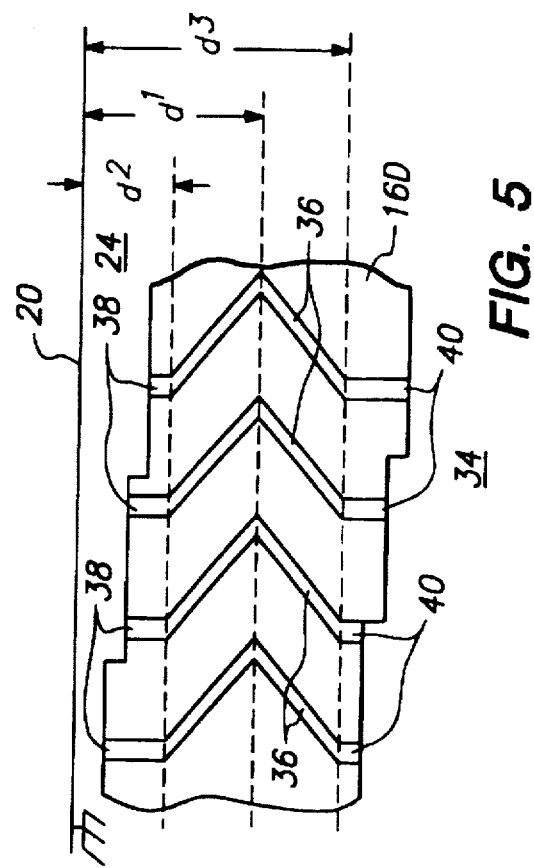
FIG. 4 is a diagrammatic unwrap plan view of a herringbone groove formed in a raised portion which has been axially displaced from a reference datum plane, illustrating an offset tolerance encountered in the prior-art groove-forming method.

FIG. 4 illustrates another tolerance variation. In this example, the raised region 16C is of nominal axial length, but it is offset from the axial datum plane by a dimension 22C which is longer than the nominal offset dimension 22. At the same time, the locus of symmetry d1 is not offset from the grooving machine axial data plane 20, with the result that a skewed herringbone groove pattern results wherein the outer groove segments 36-5 are, in this particular example, shorter than the inner groove segments 36-6. The pumping forces induced by these non-symmetrical grooves are unbalanced, resulting in a net flow of lubricant from the central reservoir region 34 to the outer reservoir region 24.

Figure 5:
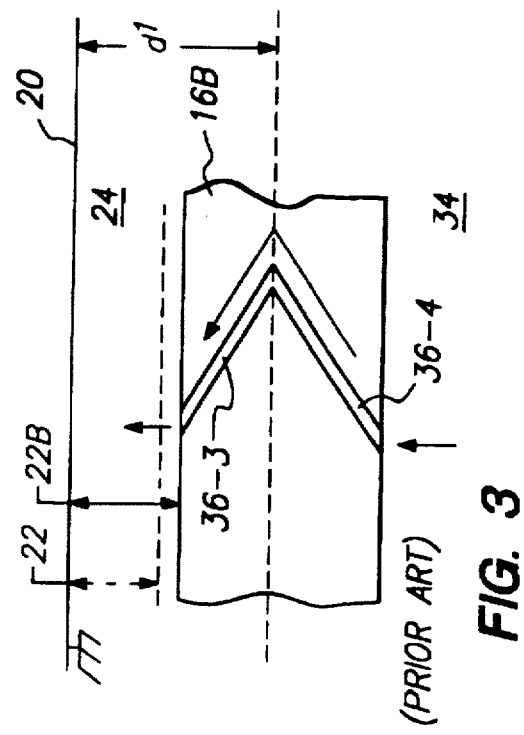
FIG. 5 is a diagrammatic unwrap plan view of a step-herringbone groove pattern in accordance with the principles of the present invention and formed in a raised portion manifesting oversize, undersize and offset tolerances.

FIG. 5 illustrates the groove-forming methodology in accordance with principles of the present invention. In the new method, the groove-forming machine or technology is again referenced to the axial datum plane 20. However, two other boundary loci for the herringbone groove pattern are defined, an outer groove pattern boundary locus at a dimension d2 from the axial datum plane 20, and an inner groove pattern boundary locus at a dimension d3 from the axial datum plane 20 (hereinafter referred to respectively as locus d2 and locus d3, or loci d2 and d3). In accordance with the new method, the loci d2 and d3 are fixed to be inside of the axial lengths of plateau regions within reasonably expected machining tolerances as may be encountered in mass production of hydrodynamic bearing assemblies. In accordance with the new method, the groove-forming machine or technology starts forming a groove following axial translation from an actual edge of the raised region 16 until the outer locus of symmetry d2 is reached. This initial axial grooving step results in a short step groove 38 which is neutral with respect to hydrodynamic pumping action.

Once the outer locus d2 is reached, simultaneous translation and rotation of the grooving machine or patterning head enables an extremely precise herringbone pattern of grooves 36 to be formed, beginning at the outer locus d2, continuing to the central locus of symmetry d1, and reversing rotational displacement while maintaining axial displacement until the inner locus d3 is reached, at which point rotation of the grooving machine or patterning head stops while axial displacement continues for a short distance to the inner edge of the raised region 16, resulting in a series of inner steps 40 whose axial lengths vary in accordance with the machining tolerance variations from sleeve to sleeve in mass production. Of course, FIG. 5 is an exaggeration of tolerances along both the outer edge and the inner edge of the raised portion, for purposes of illustrating more clearly the principles of the present invention. With the precisely symmetrical pattern of herringbone grooves 36, there is no net pumping action resulting during operation of the bearing system 10, and conventional seals and sealing techniques, such as capillary seals, at the exterior boundaries to ambient of the bearing system 10 are entirely adequate to prevent leakage or loss of lubricant.

FIG. 5 presents an exaggeration of actual tolerances encountered in practice. Offset in the nominal axial distance from the axial datum plane 20 to the edge of the raised region 16 may typically vary by ±0.0005 inch, whereas axial length of the raised region 16, 18 may vary by ±0.001 inch. While these tolerances are small, they have been found to result in unbalanced groove patterns and have caused unwanted net pumping action of lubricant at the bearing.

One additional advantage of the step-groove forming method of the present invention is that it overcomes any hysteresis tolerances within a ball-grooving device otherwise present when it encounters the edge of the raised portion 16, 18. The balls become properly seated within the ball grooving device while being translated in an axial dimension before simultaneous rotation occurs. Also, those skilled in the art will appreciate that the transition between the axial portions 38 and 40 and the herringbone pattern portions 36 may be smoothly rounded as the ball grooving machine begins to rotate as it also translates relative to the shaft or sleeve being grooved. Furthermore, although a herringbone or Vee groove pattern is shown as preferred in FIG. 5, those skilled in the art will appreciate that other geometric patterns resulting in net zero pumping action of hydrodynamic lubricant are within the contemplation of the present invention.

Additionally, while the groove forming principles of the present invention are applicable to axial thrust bearing systems, grooves in such systems are more satisfactorily formed using conventional coining techniques, as the grooved hydrodynamic pumping surfaces are planar. Also, leakage at the boundaries of hydrodynamic thrust bearings has been observed to be less problematic than leakage resulting from tolerance variations at cylindrical hydrodynamic journal bearings.

FIG. 6 presents an enlarged sectional view of a brushless DC motor including a hydrodynamic spindle system formed in accordance with the method of the present invention. The motor 100 includes a lower flange or base 102 formed e.g. of aluminum alloy and defines an opening into which a hardened steel shaft 104 is press-fit or is secured in place by a suitable adhesive. A bronze outer sleeve 106 is secured concentrically over a bronze inner sleeve 107, as by heating the outer sleeve 106 and/or chilling the inner sleeve 107, and then press-fitting the two sleeves 106, 107 together into a tight interference fit. The inner sleeve 107 in turn fits closely over the shaft 104 and is free to rotate relative to the shaft 104.

As illustrated in FIG. 7, two flats are ground into the inner sleeve 107 and provide for hydrodynamic lubricant recirculation passageways denoted by reference numerals 109 and 111. An end-plate 108 secures the inner sleeve 107 in place upon the shaft 104. The passageways 109 and 111 are e.g. arranged on opposite sides of the inner sleeve 107 and are sized no larger than to permit suitable recirculating flow of lubricant between thrust bearings 131 and 136 during operation of the bearing system, and while the bearing components are at rest in a static condition, so that pressures developed within the bearing system are relieved and so that no lubricant escapes via outer capillary seals 122 and 138.

A hub 110, e.g. of aluminum alloy, is secured upon the outer sleeve 106, e.g. with a suitable adhesive. The hub 110 includes a lower annular flange 112 which may be used to support a stack of spaced apart hard disks for a hard disk drive, for example. A laminated stator coil assembly 114 defining a plurality of coils and slots cooperates with an annular permanent magnet ring 116 which is magnetized to define pole faces adjacently facing the stator coil assembly, so that switched DC driving currents flowing in the coils induce the magnet 116, a ferromagnetic magnet flux ring 118, the hub 110 and the sleeve 106 to rotate relative to the shaft 104 and base 102 in a controllable velocity.

The shaft 104 defines or is fitted with a lower hydrodynamic thrust bearing flange 120 having a thrust bearing surface which may be patterned e.g. by conventional coining techniques to have a spiral pumping pattern for pumping hydrodynamic lubricant at a lower disk-shaped hydrodynamic thrust bearing 131. An outer reservoir and seal structure 122 provides one source of lubricant to the bearing 131, while an inner axial reservoir 128 on the other side of the thrust bearing 131 provides another source of hydrodynamic lubricant.

Axially inside of the lower inner reservoir 128 is a lower hydrodynamic journal bearing 126 which includes a step-herringbone pumping pattern formed in accordance with the method of the present invention. In this example, an inwardly raised region is defined by the inner bronze sleeve 107 which is grooved in the desired pattern by e.g. a ball-grooving machine as described above. A central annular hydrodynamic lubricant reservoir 130 extends from the lower journal bearing 126 to an upper hydrodynamic journal bearing 132, also formed in accordance with the method of the present invention. An upper inner reservoir 134 provides a source for lubricant to the upper journal bearing 132, and also to the upper disk-shaped hydrodynamic thrust bearing 136 formed between an outer shoulder of the sleeve and the end plate 108. An outer seal arrangement 138 also supplies hydrodynamic lubricant to the upper thrust bearing 136 and prevents unwanted escape of lubricant to the ambient. The seal structure includes a disk 140 atop the end plate 108.

Figure 8:
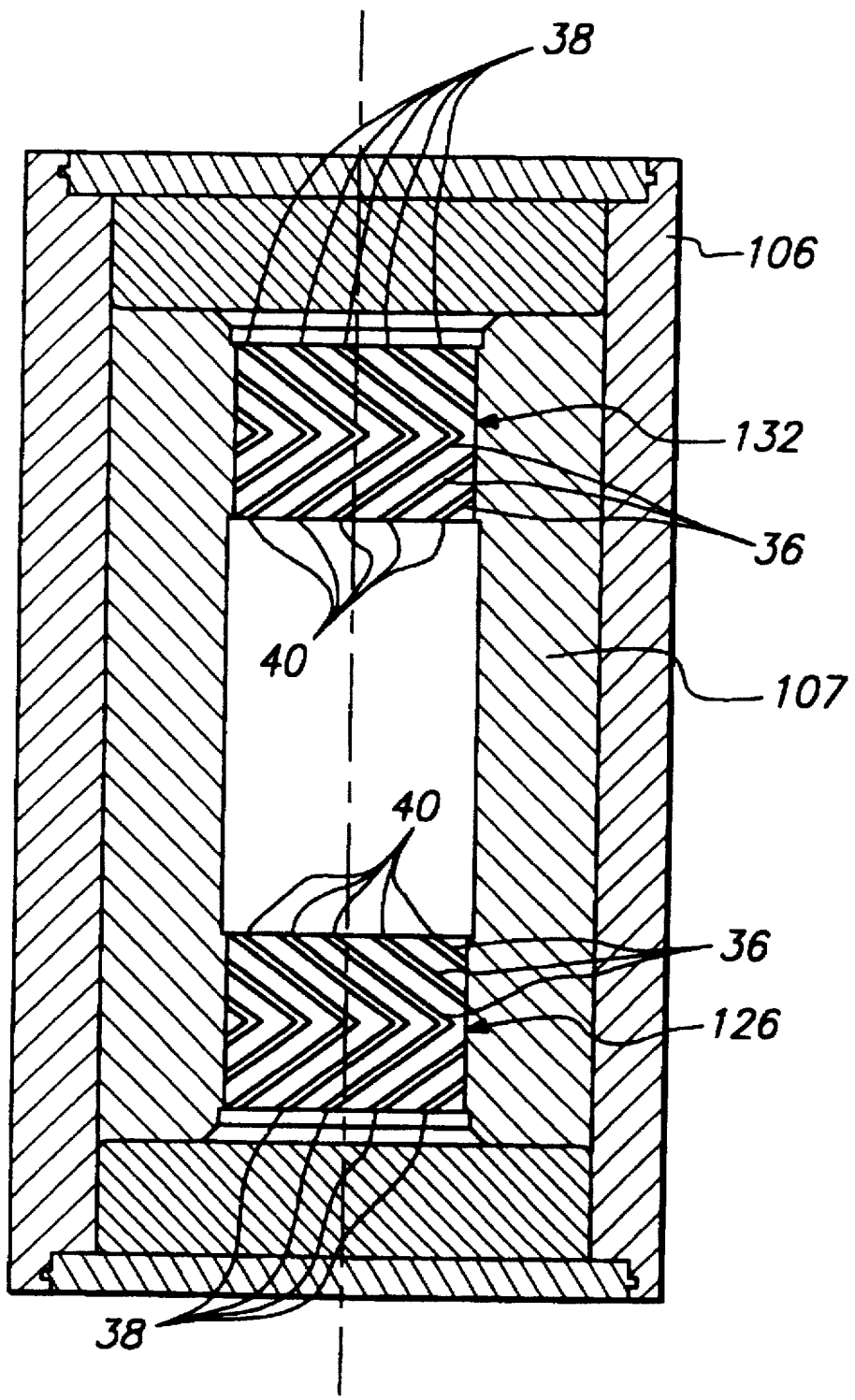
FIG. 8 is a diagrammatic sectional view of the FIG. 1 herringbone groove pattern formed in inwardly raised portions of a bearing sleeve portion, such as the sleeve used in the FIG. 6 system, in accordance with the FIG. 5 method, resulting in a stepped herringbone pattern achieving greater precision and repeatability in manufacturing.

FIG. 8 is an enlarged elevation view of the outer bearing sleeve 106-inner bearing sleeve 107 of the FIG. 6 hydrodynamic bearing system and illustrates in "unwrap" perspective the step-grooved pumping patterns formed at the lower journal bearing 126 and at the upper journal bearing 132 of the inner sleeve 107. Each pattern groove 36 includes short step portions 38 and 40, in a more life-like perspective than in the exaggerated view of FIG. 5.

FIG. 9 illustrates a slightly different pumping pattern for the journal bearings 132A and 126A. In this arrangement, outer pumping groove segments 36A are noticeably longer than are associated inner pumping groove segments 36B, with a global result that lubricant pressure is increased in the central lubricant reservoir region 34. However, this system is also made to remain in equilibrium with negligible lubricant flow, by virtue of the short steps 38 and 40 at the ends of the pumping grooves 36, accordance with principles of the present invention.

While the expressions "upper" and "lower" have been used herein, such expressions should be understood to relate to the base 102 and orientation of the view of FIG. 6, rather than to any particular orientation of the bearing assembly or motor 100, its operation not being restricted to any particular orientation relative to gravitational force.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A self-contained, spiral-groove hydrodynamic spindle bearing system comprising a shaft and a sleeve closely fitting over the shaft for enabling relative rotation between the shaft and the sleeve and cooperatively defining two spaced apart hydrodynamic bearing regions, each bearing region being characterized by a spiral-groove pumping pattern of grooves defined in one of the shaft and sleeve, each one of the grooves including a longitudinally extending groove step at an outer end and at an inner end of the groove, and hydrodynamic lubricant installed in the bearing system and being pumped at the bearing regions during relative rotation between the shaft and the sleeve.

2. The hydrodynamic spindle bearing system set forth in claim 1 further comprising a lubricant reservoir for the hydrodynamic lubricant is defined as an annular region between the shaft and the sleeve.

3. The hydrodynamic spindle bearing system set forth in claim 1 further comprising outer lubricant reservoirs for the hydrodynamic lubricant defined as annular regions axially outside of the two spaced apart hydrodynamic bearing regions.

4. The hydrodynamic spindle bearing system set forth in claim 3 further comprising at least one hydrodynamic lubricant recirculation passage for communicating hydrodynamic lubricant between the outer lubricant reservoirs.

5. The hydrodynamic spindle bearing system set forth in claim 3 further comprising two diverging wall capillary seals including hydrodynamic lubricant and communicating with the outer lubricant reservoirs and with an exterior ambient environment.

6. The hydrodynamic spindle bearing system set forth in claim 1 further comprising two annular plates attached to the shaft and overlying annular end portions of the sleeve, the annular end portions and the annular plates cooperatively defining two spiral groove hydrodynamic axial thrust bearing regions.

7. The hydrodynamic spindle bearing system set forth in claim 6 wherein the sleeve comprises an outer sleeve and an inner sleeve, the inner sleeve being secured concentrically within the outer sleeve and defining at least one axial passage for hydrodynamic lubricant communicating between the two spiral groove hydrodynamic axial thrust bearing regions.

8. The hydrodynamic spindle bearing system set forth in claim 6 further comprising two diverging wall capillary seals including hydrodynamic lubricant and communicating with the spiral groove hydrodynamic axial thrust bearing regions.

* * * * *